H. G. BLOKUSEWSKI.
TEST SWITCH FOR RECORDING WATTMETERS.
APPLICATION FILED JUNE 25, 1909.

992,539.

Patented May 16, 1911.

2 SHEETS—SHEET 1.

Witnesses:

Inventor
Hans Georg Blokusewski
By his Attorney

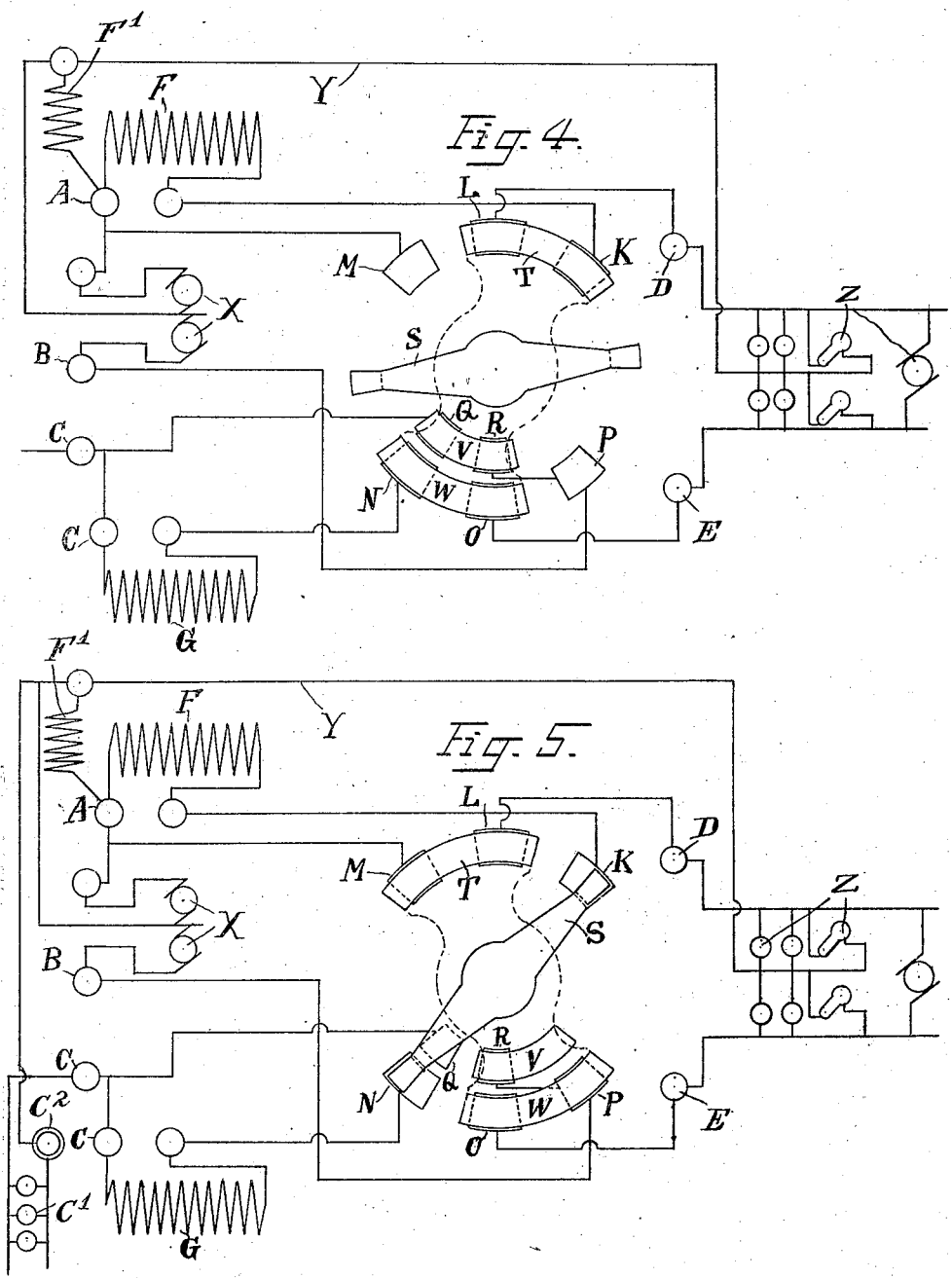

UNITED STATES PATENT OFFICE.

HANS GEORG BLOKUSEWSKI, OF WEEHAWKEN, NEW JERSEY.

TEST-SWITCH FOR RECORDING-WATTMETERS.

992,539. Specification of Letters Patent. Patented May 16, 1911.

Application filed June 25, 1909. Serial No. 504,272.

*To all whom it may concern:*

Be it known that I, HANS GEORG BLOKUSEWSKI, a citizen of the Empire of Germany, and a resident of Weehawken, county of Hudson, and State of New Jersey, have invented certain new and useful Improvements in Test-Switches for Recording-Wattmeters, of which the following is a specification.

This invention has reference to a novel test switch for recording wattmeters particularly used in the three wire system. The novel test switch is permanently arranged in the system. It is adapted to change the electric circuit recording the customer's load into a non-recording position and places the meter coils into a testing position without interrupting the customer's service. By the use of this switch the three wire system on the house side of the meter is retained during the test and the voltage and potential of any point remains the same.

Heretofore when testing a recording wattmeter a number of manual operations were necessary to get the wattmeter ready for a test and sometimes series straps were used to put the field in series. These operations took time and caused inconvenience to the user. When shunting the customer's load a change in the polarity of one side of the customer's system was made whereby the potential difference between the two potential wires was reduced to zero.

Figure 1:
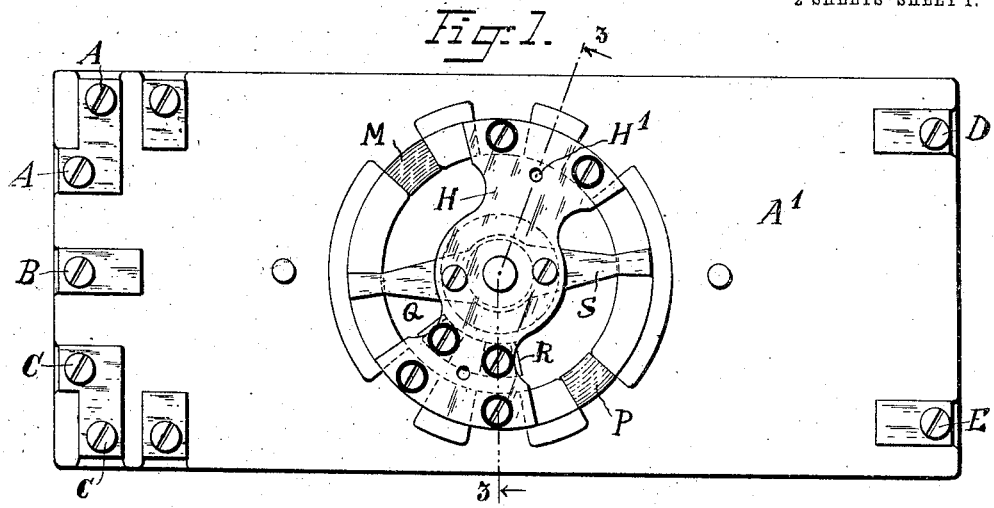
Figure 2:
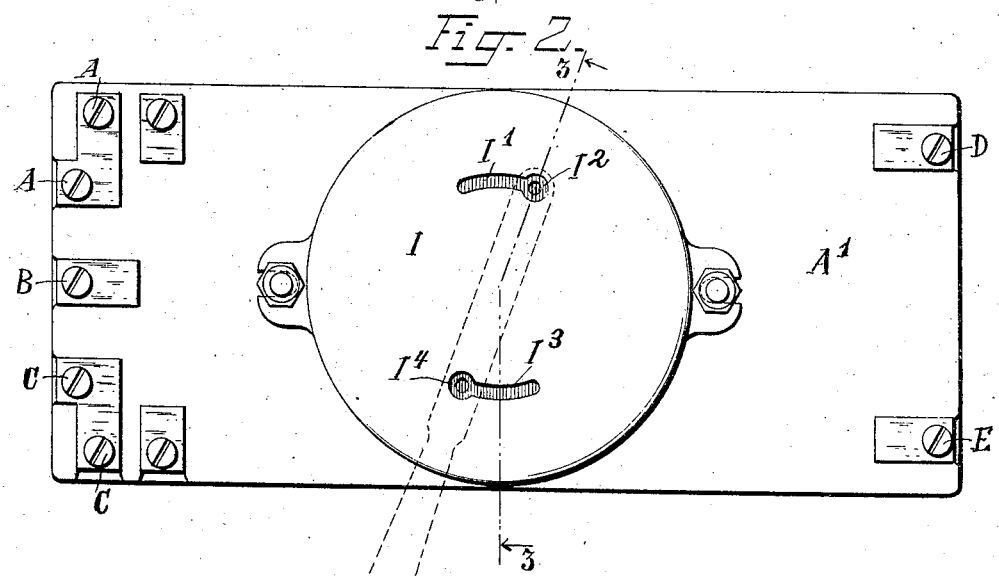
Figure 3:
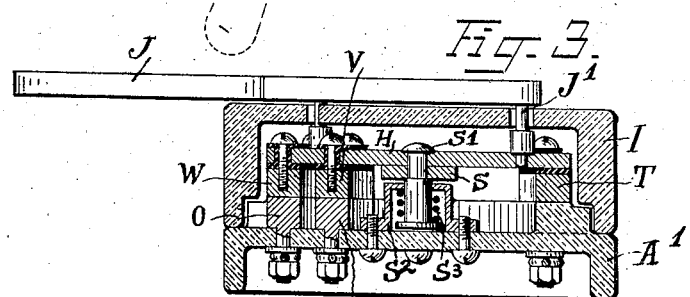

The above described deficiencies are all avoided by the use of my novel test switch which is permanently embodied in the system. When desiring to test the recording wattmeter it is necessary to solely insert a key and turn the switch from the working into the testing position. When the test has been made the key can not be removed unless the switch is returned into the working position thus preventing the use of current without being recorded. By turning the switch from the working position into the testing position all the required connections are made and the load in each field is shunted with its original polarity, the house wires and one service wire are disconnected from the fields and the fields are placed in series. The connections are made and broken in proper succession so as not to break the current at any moment nor make any short circuits. In addition to these main objects it has been sought to reduce the cost of production by simplicity in construction. It has further been attempted to secure novelty and attractiveness in appearance so as to make the test switch a neat and desirable article, all as will be fully described hereinafter with reference to the accompanying drawings in which:

Figure 1 represents in top plan view a test switch without cover for recording wattmeters embodying in desirable form the present improvements. Fig. 2 is a top plan view of same with cover thereon. Fig. 3 illustrates the test switch in section on line 3, 3 of Figs. 1 and 2. Fig. 4 is a diagrammatical view of the switch with its wire connections in the working position, and Fig. 5 is a like view of the test switch in the testing position.

Similar characters of reference denote like parts in all the figures.

The test switch is mounted on a support made of electrically insulating, non-conducting material such as for instance insulating rubber composition. I, however prefer to make the base or support together with the insulating blocks thereon out of one porcelain casting, the conducting parts being secured thereto by means of screws and nuts.

On the drawing $A^1$ designates the porcelain base or support.

A, B are the binding posts for the service wires; D, E represent the binding posts for the house wires and C is the binding post for the loadlead while F, G represent the meter fields and $F^1$ the armature of the meter as shown in Figs. 4 and 5.

A number of brass blocks are stationarily mounted on the base. The blocks M L K shown on the drawing on the upper side and the blocks N O P shown on the drawing on the lower side are arranged in a circle. Two additional blocks Q R are located near the blocks N O P also arranged in a curve. A brass lever S with segmental downward end portions, as indicated by dotted lines is centrally mounted on the base between the various blocks above mentioned. It turns on a bolt $S^1$ extending below into a small housing $S^2$ and is surrounded within the housing by a coiled spring $S^3$, see Fig. 3 which tends to pull the lever downward the purpose of which will be explained farther down. To the top portion of the lever a broad brass part H is permanently secured having segmental end portions. Three brass segments W V T are carried by this brass part H. All three segments are secured to its lower portion and insulated from each other and also from the brass part H and the brass lever S. The segment T is purposed to slide on the conducting blocks M L and K while the brass segment W is purposed to slide on the brass blocks N O P and segment V on the blocks Q and R. Thus the segments W V T, the brass part H which carries them and the lever S to which the part H is rigidly connected represent the movable mechanism of the switch.

As shown in Fig. 2, a cover I of insulating material closes the mechanism.

In order to turn the switch conveniently from the working into the testing position a handle J may be inserted. When turning the switch by means of the key or handle from the working into the testing position, the required connections are made without interrupting the service. As seen in Fig. 4 the path of the current is as follows: from the set of generators X the current flows to the binding post A of the service wire and then passes through the meter field F, the conducting block K, the segment T, the conducting block L into the house wire D. From the binding post B of the second service wire the current passes through the conducting block P, the inner conducting block R, the segment V, the conducting block Q, through the field G, the conducting block N, the segment W, the block O to the house wire E. The neutral wire Y passes the one lead of the armature F' of the meter and then into the system in the usual manner. The working load Z is represented by arc lamps, incandescent lamps, mercury vapor lamps and a motor. These are the connections of the test switch when in the working position.

By the use of this switch the polarity of any point in the system always remains the same. This renders it possible to use this test switch for a working load containing on either side of the system arc lamps, flaming arc lamps, mercury vapor lamps and motors and across the two outside wires apparatus requiring the voltage across the two outside wires, as motors and lamps.

In Fig. 5 of the drawing the test switch is represented in the testing position. With the test switch forming the subject matter of this invention an auxiliary load Z for testing purposes may be used which may be altered as conditions require. It is represented by a lamp bank $C^1$ in Fig. 5 of the drawing located between the binding post C and the standard meter or ammeter $C^2$ according to the style of testing. From such meter, connection is made with the neutral wire Y of the three wire system. As is plainly seen a slight movement suffices to turn the movable mechanism of the switch into the testing position. The current formerly passing through the field F now flows from the binding post A of the service wire to the block M, the segment T, the block L into the house wire D. The current formerly passing through the field G now flows through the binding post B, the block P, the segment W, the block O to the house wire E. The test current now flows through the binding post A, the field F, the block K, the brass lever S, the block N, the field G to the loadlead C, the auxiliary load and the meter $C^2$ into the neutral wire Y. Thus by turning the switch the two fields have been placed in series. After having tested the recording wattmeter the operator might withdraw the key or handle J and leave the switch in the testing position whereby the current would be used without being recorded. To prevent this, the key J is so constructed that it may be withdrawn solely when the switch is in the working position. To render this possible the cover I has a curved slot $I^1$ with an enlargement $I^2$ at the end shown in Fig. 2 at the right hand side of the slot and a second curved slot $I^3$ having a like enlargement $I^4$ at the left hand end. The key or handle J has two downward pins of which one $J^1$ is shown in Fig. 3. This pin is narrow at the top, somewhat enlarged in its middle portion and again narrow at the bottom. The enlarged portion of the pin passes easily through the enlarged portion $I^2$ of the curved slot $I^1$ and the lower narrow end of the pin enters an opening $H^1$ in the brass part H. The enlarged portion of the pin can not be withdrawn through the curved slot but solely through its enlarged end portion therefore the operator must return the test switch into the working position before he can withdraw the handle or key J. It is self evident that the movement of the key J is limited by the length of the curved slots in the cover. Accordingly the operator can turn the switch solely as far as required.

The test switch is made in different sizes and for various strengths of current. The switch is preferably embodied into the wattmeter as far as the size permits it which may be done in recording wattmeters up to about 75 amperes. Larger switches may be placed in a separate box and mounted in a convenient position.

The segments W, T, are sufficiently wide to make contact on a neighboring block during the turning of the switch into the testing position or returning same into the working position. The segment V makes contact with the corresponding blocks Q R in connection with the contact made by the segments W T with the corresponding blocks M, L, K, N, O, P. The spring $S^3$ in the housing $S^2$ tends to draw the movable mechanism downward whereby good contact is assured during the turning of the switch. Thus sparking and heating of the conducting blocks is prevented.

I claim as my invention:

1. A test switch for recording wattmeters permanently arranged in the system comprising an insulated base, permanent conducting blocks thereon normally in the path of the working circuit, conducting blocks adjoining same normally not within the circuit, movable parts mounted on the base provided with insulated blocks adapted to slide on the permanent blocks shunting thereby the customer's load in each field so that the polarity and potential difference at any point of the customer's running system remains the same as before.

2. A test switch for recording wattmeters comprising an insulated base, permanent conducting blocks thereon normally in the path of the working circuit, conducting blocks adjoining same normally not within the circuit, movable parts mounted on the base provided with insulated blocks adapted to slide on the permanent blocks changing thereby the circuit recording the customer's load into a non-recording position and placing the meter coils in series for testing without interrupting the customer's service.

3. A test switch for recording wattmeters adapted to be used in the three wire system when both lines carry customer's loads comprising an insulated base, permanent conducting blocks thereon normally in the path of the working circuit, conducting blocks adjoining same normally not within the circuit, all arranged in a circle, insulated movable parts with segmental end portions mounted on the base provided with insulated blocks adapted to slide on the permanent blocks shunting thereby the customer's load in each field so that the polarity and potential difference at any point of the customer's running system remains the same as before.

4. A test switch for recording wattmeters for use in the three wire system comprising an insulated base, three permanent conducting blocks circularly arranged thereon on one side two of which being normally in the path of the working circuit, three conducting blocks circularly arranged opposite the first ones all normally in the path of the working circuit, two additional permanent conducting blocks in said circuit arranged in a curve within the last mentioned blocks, a movable lever mounted centrally within the base, a brass part permanently secured to the lever carrying insulated segmental contacts adapted to slide on the outer conducting blocks, a second insulated segment inwardly arranged on said brass part adapted to slide on the two inner conducting blocks and a key for turning the movable parts.

5. A test switch for recording wattmeters adapted to be used in the three wire system comprising an insulated base, three conducting blocks circularly secured on one side two being in the working circuit, three conducting blocks circularly arranged opposite the first all in the working circuit, two additional conducting blocks in said circuit secured within the said last blocks, a movable lever centrally within the base, a brass part secured to the lever with segmental insulated contacts adapted to slide on the outer blocks, a second insulated segment on said brass part adapted to slide on the two inner blocks, a key for turning the movable parts changing thereby the flow of the current to the nearby free block of the first set, the segment thereon, the adjoining block into the one service wire and to the remote block of the second set, the segment thereon, the neighboring block into the second service wire.

6. In a test switch of the type described a set of three conducting blocks circularly arranged on one side two being in the working circuit, a set of three conducting blocks circularly arranged opposite the first all in said circuit, two additional blocks arranged in a curve within and near the last mentioned blocks, a movable lever suitably mounted and a brass part secured to the lever and carrying insulated segmental contacts adapted to slide on the block.

Signed at New York, N. Y., this 24th day of June, 1909.

HANS GEORG BLOKUSEWSKI.

Witnesses.
LUDWIG K. BOHM,
ALFRED LYONS.